United States Patent
Laverne

[15] 3,680,290
[45] Aug. 1, 1972

[54] CROP CONDITIONER WITH BAFFLE OF FLUFFER MEANS

[72] Inventor: Jules L. Laverne, Gray-la-Ville, France

[73] Assignee: Deere & Company, Moline, Ill.

[22] Filed: Oct. 12, 1970

[21] Appl. No.: 79,961

[30] Foreign Application Priority Data

March 9, 1970 Germany............P 20 11 013.8

[52] U.S. Cl...........................................56/1, 56/192
[51] Int. Cl................................................A01d 57/26
[58] Field of Search...............56/1 C, 14.4, 14.5, 192

[56] References Cited

UNITED STATES PATENTS 3,241,300   3/1966   Fell et al. ....................56/DIG. 1
3,039,256   6/1962   Witt............................56/DIG. 1

*Primary Examiner*—Louis G. Mancene
*Assistant Examiner*—J. A. Oliff
*Attorney*—H. Vincent Harsha, Harold M. Knoth, William A. Murray, John M. Nolan and Raymond L. Hollister

[57] ABSTRACT

A crop conditioner with a swath or windrow fluffer freely suspended to yield to crop forces and is further made up of a plurality of separate baffle members selectively adjustable and laterally interconnectable.

10 Claims, 4 Drawing Figures

INVENTOR.
J. L. TAVERNE

INVENTOR.
J. L. TAVERNE

CROP CONDITIONER WITH BAFFLE OF FLUFFER MEANS

BACKGROUND OF THE INVENTION

Crop conditioners with fluffers are well known, the fluffer being conventionally a baffle or deflector adapted to intercept and redirect the crop as trajected rearwardly and upwardly by the conditioner rolls, the purpose of the deflector being to fluff the crop so that when it returns to the ground it is in better condition for curing. Prior art deflectors are conventionally fixed or selectively adjustable but once set cannot change position as the crop varies in density, weight, moisture content etc., so that a given deflector setting is not entirely suitable for varying crop conditions, especially, where, as is typical, crop conditions vary not only from swath to swath but within the same swath or stand. Consequently it is necessary for the operator to make frequent manual adjustments or compromise with one adjustment.

SUMMARY OF THE INVENTION

According to the present invention, the baffle or deflector means is suspended in such manner as to yield for free movement back and forth in response to varying forces imparted by the changing nature of the trajected crop, yielding relatively slightly to light crop and relatively extensively to heavier crop, resulting in the formation of desirable fluffing as the crop is returned to the ground. Moreover, the baffle means is constructed as a plurality of separate plate-like members or panels disposed in side-by-side relation and individually suspended so as to be independently freely swingable whereby to accommodate different forces in the lateral width of the trajected crop path. Also, the transverse length of the baffle means may be adjusted by adjusting the relative position of the baffle members. Further, certain of the members are selectively connectible to swing in unison and thus to increase their resistance to swinging under impact by extra-heavy crop.

DESCRIPTION OF A PREFERRED EMBODIMENT

Figure 2:
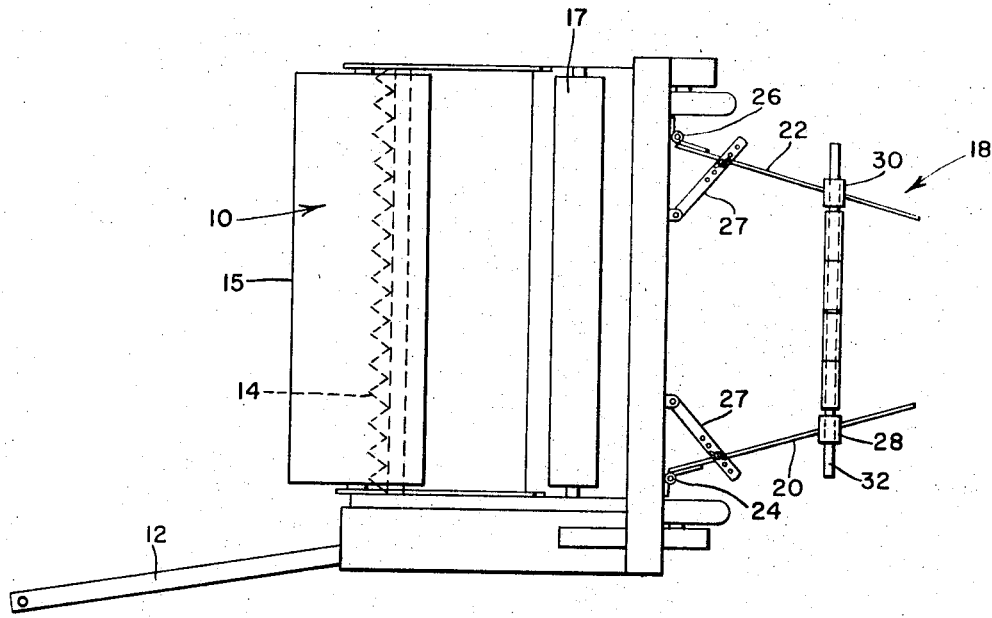
FIG. 2 is an enlarged perspective of the baffle means adjusted for a wide setting.
Figure 1:
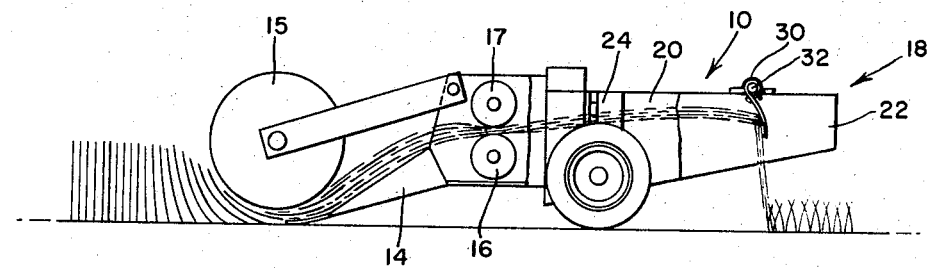
FIG. 1 is a side view, largely schematic, of a typical conditioner as equipped with a preferred embodiment of the invention.

The general characteristics of a typical crop conditioner will be recognized from FIGS. 1 and 2 without detailed description. The basic machine 10 has a draft tongue 12 for connection to a tractor for advance over a field. In some instances, the crop will have been previously cut, as by a mower, and will be subsequently picked up and conditioned. In other cases, the conditioner includes harvesting means for cutting the crop and forthwith directing it to the conditioner means. The present illustration is of the latter type of machine and a typical cutter is shown at 14, including a surface or ramp over which the cut crop is moved by a reel 15 to a pair of horizontal, rotatably cooperative conditioner rolls 16, 17, which may be of either the crusher or crimper type.

The nature of the action on the crops is such that the conditioned crop is trajected upwardly and rearwardly for return to the ground for curing, as is well known, and the return of the crop to the ground is achieved in part by crop control means including baffle or deflector means 18. In the present instance, this means is carried between rearwardly extending left and right side sheets 20 and 22 which serve as side supports. These sheets are respectively pivoted or hinged at their front ends to the frame of the machine at 24 and 26, and their positions, as to lateral spacing of their rear ends—or rearward convergence—are selectively settable by means of adjustable means 27. By this means, the cutter 14 may cut a rather wide swath and, if the side sheets are convergent as shown, the return of the crops to the ground will be in the form of a windrow narrower than the swath. Conversely, the side sheets may be adjusted to parallelism and the return to the ground will be about the width of the cut swath. Of course, a variety of adjustments may be made, all of which is known in the art as to side sheets per se.

The side sheets or supports 20 and 22 respectively carry mounts 28 and 30 adjacent to their rear ends for carrying a transverse support 32, which may be a shaft, rod or the like. This rod is slidable in the mounts 28 and 30 to accommodate adjustment of the side sheets 20 and 22. The baffle or deflector means is suspended from this rod or shaft 32 and, in a preferred embodiment, takes the form of a plurality of separate panels or plate-like members 34, 36, 38 and 40, the first two providing a set or group at one side of an abutment 33 on the rod 32 and the latter two forming a similar set at the opposite side of the abutment.

Fundamentally, the baffle means is carried by the conditioner so as to be freely yieldable back and forth in response to crop forces as trajected crop impinges on the crop-intercepting baffle means. A preferred way of suspending the baffle means is, as shown here, pivoting of the baffle means for free swinging. To this end, the baffle member 36 has an upper end of inverted U shape, as at 42, and the baffle member 38 is similarly formed at 44. The member 36 has a plurality of holes 46 therein for selectively receiving pins 48, and each pin is retained by a cotter 50. A similar arrangement is provided for the member 38. It will be clear that the pins 48 pass below and not through the rod or shaft 32, and hence the members are freely swingable about the transverse horizontal axis established by the rod or shaft.

Figure 4:
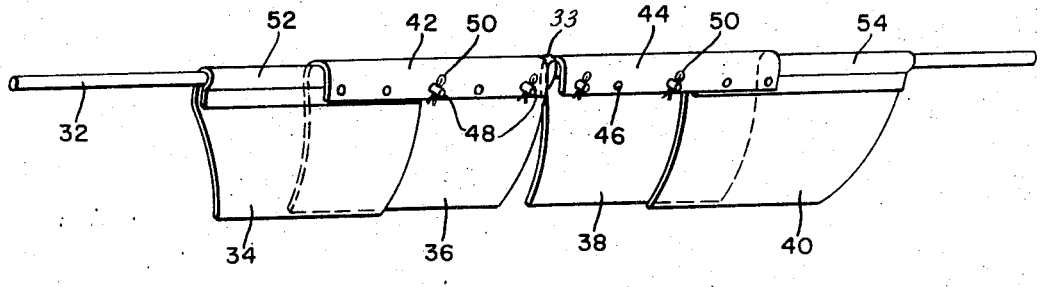
FIG. 4 is a similar view but showing the baffle members adjusted for a narrower setting or for increased resistance.

The upper end of the left-hand outermost baffle member has a hook or U-shaped upper end, but the one bight of the U is brought closely back to the body of the member or panel so that the latter cannot escape from the rod or shaft. A like formation exists at 54 for the right-hand outer baffle member 40. A further feature here is that the U-shaped formations at 42 and 44 are of larger dimension than those at 52 and 54, so that, as shown in FIG. 4, the smaller U-shaped portions may telescope respectively into the larger portions 42 and 44, which is accomplished by removing the outer pins 48 and re-inserting them in inward holes 46. As said above, the pins 48 pass below the shaft 32 and thus retain the members 36 and 38 from accidental dislodgment from the shaft.

The telescopic arrangement just described provides several advantages. First, the lateral length of the baffle means may be adjusted in accordance with adjustment of the side sheets 20 and 22 about their respective pivots 24 and 26 as controlled by the braces 25 and 27. Additionally, the slightest overlap between, for example, the members 34 and 36 serves as interconnecting means for causing the paired or neighboring members to swing in unison, thus increasing or combining their resistance to crop forces. This same thing is true, of course, as to the members 38 and 40.

Figure 3:
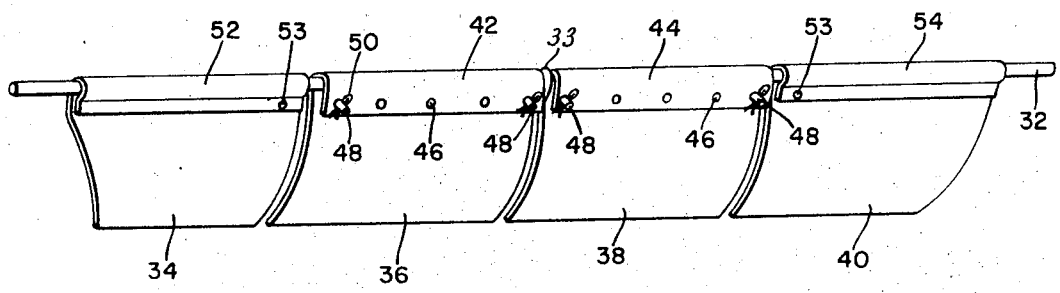

In operation, and in anticipation of generally light crop and a wide return of the crop to the ground, the members 34, 36, 38 and 40 may be set as in FIG. 3, in which the maximum continuous width or length of the baffle means is achieved and in which each member is individually swingable and thus accommodates itself to the portion of the trajected crop path impinging thereupon; that is, if crop forces vary across the width of the crop path, one member may yield more or less than the other. If the crop is especially heavy, the members 34 and 36 and those at 38 and 40 may be interconnected by the simple expedient of overlapping the respective members of a pair by shifting the pins 48 and telescoping the outer members into the respective inward members. If desired, each of the members 34 and 40 may have a hole 53 for receiving the associate pin 48 to effect an interconnection among the paired members irrespective of the positions of the side sheets 20 and 22.

I claim:

1. A crop conditioner adapted to advance over a field and having crop gathering and conditioning means including a pair of horizontal transverse rolls cooperatively rotatable to traject crops upwardly and rearwardly for return to the ground, a pair of rearwardly extending side supports spaced laterally apart behind the rolls, and transversely extending baffle means disposed between the side supports in the path of the trajected crops so as to change the trajectory, characterized in that the baffle means is freely pivotally suspended at only its upper portion between the side supports to hang freely into the crop path in a normally vertically extending position and yieldable to swing freely from and back to said vertical position under varying forces imposed on said baffle means by the trajected crops.

2. The invention defined in claim 1, further characterized in that a transverse support extends between and is carried by the side supports and the baffle means depends from and is pivoted to the transverse support for free back and forth swinging.

3. The invention defined in claim 2, further characterized in that the baffle means comprises a plurality of separate plate-like members disposed in side-by-side relation and independently pivoted to the transverse support for individual free swinging.

4. The invention defined in claim 3, further characterized in that certain of the members are connectible to each other for swinging in unison.

5. The invention defined in claim 4, further characterized in that the connectible members are relatively laterally shiftable on the transverse support into partially overlapping relation to each other for swinging in unison.

6. The invention defined in claim 5, further characterized in that each member of a pair of connectible members has an upper end of inverted U shape hooked over the transverse support and said upper ends are relatively differently dimensioned so that one can be telescoped into the other.

7. The invention defined in claim 3, further characterized in that the members are selectively and relatively laterally adjustable along the transverse support so as to vary the horizontal length of the baffle means.

8. The invention defined in claim 7, further characterized in that the side supports are hingedly connected at their forward ends to the conditioner for selective relative adjustability toward and away from each other so as to vary the lateral distance between their rear ends.

9. The invention defined in claim 3, further characterized in that the transverse support has an intermediate abutment thereon and the members are grouped in sets respectively at each side of the abutment.

10. The invention defined in claim 9, further characterized in that certain of the members of each set are selectively interconnectible for swinging in unison.

* * * * *